United States Patent [19]

Wright

[11] Patent Number: 4,962,946
[45] Date of Patent: Oct. 16, 1990

[54] SUSPENSION UNIT FOR ACTIVE SUSPENSION SYSTEM

[75] Inventor: Peter G. Wright, Norfolk, England

[73] Assignee: Group Lotus P/C, Norfolk, England

[21] Appl. No.: 334,835

[22] Filed: Apr. 7, 1989

[30] Foreign Application Priority Data

Apr. 8, 1988 [GB] United Kingdom ............... 8808319

[51] Int. Cl.$^5$ ............................................. B60G 17/04
[52] U.S. Cl. ................................... 280/710; 280/707; 188/299
[58] Field of Search ............... 280/707, 710, 702, 703, 280/704, 714; 188/297, 299

[56] References Cited

U.S. PATENT DOCUMENTS

| | | |
|---|---|---|
| 3,603,610 | 9/1971 | Thompson ............................ 280/708 |
| 3,871,681 | 3/1975 | Piniot ................................... 280/701 |
| 4,111,456 | 9/1978 | Arnold et al. ........................ 280/692 |
| 4,154,461 | 5/1979 | Schnittger ............................ 280/710 |
| 4,273,317 | 6/1981 | Blee ..................................... 267/64.17 |
| 4,275,900 | 6/1981 | Andreoli et al. .................... 280/710 |
| 4,625,993 | 12/1986 | Williams et al. .................... 280/707 |
| 4,743,046 | 5/1988 | Schnittger ............................ 280/710 |
| 4,805,886 | 2/1989 | Hassan ................................. 280/710 |

FOREIGN PATENT DOCUMENTS

| | | |
|---|---|---|
| 2626392 | 12/1977 | Fed. Rep. of Germany . |
| 2834528 | 2/1980 | Fed. Rep. of Germany . |
| 2026743 | 9/1970 | France . |
| 2216133 | 8/1974 | France . |
| 8402886 | 8/1984 | PCT Int'l Appl. . |
| 1297965 | 11/1972 | United Kingdom . |
| 1453869 | 10/1976 | United Kingdom . |
| 1521658 | 8/1978 | United Kingdom . |

Primary Examiner—Richard A. Bertsch
Attorney, Agent, or Firm—Seidel, Gonda, Lavorgna & Monaco

[57] ABSTRACT

A vehicle with an active suspension system has a road wheel suspension unit comprising a double-acting hydraulic actuator extending between a fitting connected to the vehicle body or chassis and a pivoted road wheel suspension arm, a coiled compression spring in parallel with and surrounding the actuator, a load cell for signalling actuator loading, and a resilient isolator ring in series between the load cell and the fitting, or the actuator and the load cell.

17 Claims, 3 Drawing Sheets

SUSPENSION UNIT FOR ACTIVE SUSPENSION SYSTEM

FIELD OF THE INVENTION

The invention relates to a suspension unit for use in an active suspension system for a vehicle.

BACKGROUND OF THE INVENTION

Vehicle active suspension systems require suspension units for the vehicle wheels which incorporate controllable actuators and transducer means for providing information about road wheel experience. The information is supplied to a control system which in turn provides signals for controlling the actuators. Vehicle active suspension systems are described for example in U.S. Pat. No. 4,625,993 and in the patent to be granted on application Ser. No. 747,130, the contents of which are incorporated herein by reference.

It is an object of the invention to provide a vehicle wheel suspension unit comprising an actuator and transducer means responsive to wheel experience which is of improved configuration in respect of the transducer means.

It is an object of the invention to provide a vehicle wheel suspension unit comprising an actuator and a transducer in which the actuator is associated with a suspension spring and the transducer is arranged to be responsive to the actuator loading only.

SUMMARY OF THE INVENTION

In accordance with the invention and suspension system comprises a transducer operative in series with a resilient isolator device, for example, between an actuator and the vehicle body or chassis, with a suspension spring operating in parallel with the actuator directly between wheel and the chassis, through a second resilient isolator device if desired.

The invention also provides a suspension unit comprising an actuator working in parallel with a compression spring, in which the transducer is located in series with an isolator device resiliently receiving the actuator loading. The transducer and the isolator device are conveniently located together between the actuator and the vehicle chassis, and the transducer can be connected either to the actuator or to the chassis.

The invention thus provides for wheel loadings other than the actuator load to by-pass the transducer and the isolator device. The resilient isolator device is preferably associated with limit stops so that it and the transducer are not exposed to extreme loadings.

The invention can thus be carried into effect in the form of a suspension unit comprising a generally upright hydraulic actuator, preferably double acting, having a cylinder and a piston rod extending downwardly therefrom to a pivotal connection with a pivoted wheel suspension arm or axle assembly. A suspension spring coaxially received around the actuator extends between the lower end of the actuator and fixed to which the upper end of the actuator cylinder is connected through a transducer constituted by a load cell in series with an isolator means in the form of a resilient ring received between coaxial parts of the load cell and the fitting or the fitting and the actuator cylinder, and preferably provided with abutments limiting relative movements of the coaxial parts. The load cell then provides an output signal representing the actuator loading only, as the load share carried by the spring by-pass the cell and the isolator device.

The invention thus makes it possible to employ a more sensitive load cell or other transducer than in prior art suspension units, because it is not subjected to extreme loadings. Also, the limit stops associated with the isolator device permit this to be of relatively low rating, and to have increased durability because it does not undergo excessive deflections. Additionally, the transducer output, being representative of actuator loading only allows the use of energy saving control laws in the control system.

BRIEF DESCRIPTION OF THE DRAWINGS

The invention is further described below, by way of example, with reference to the accompanying drawings, in which.

Figure 1:
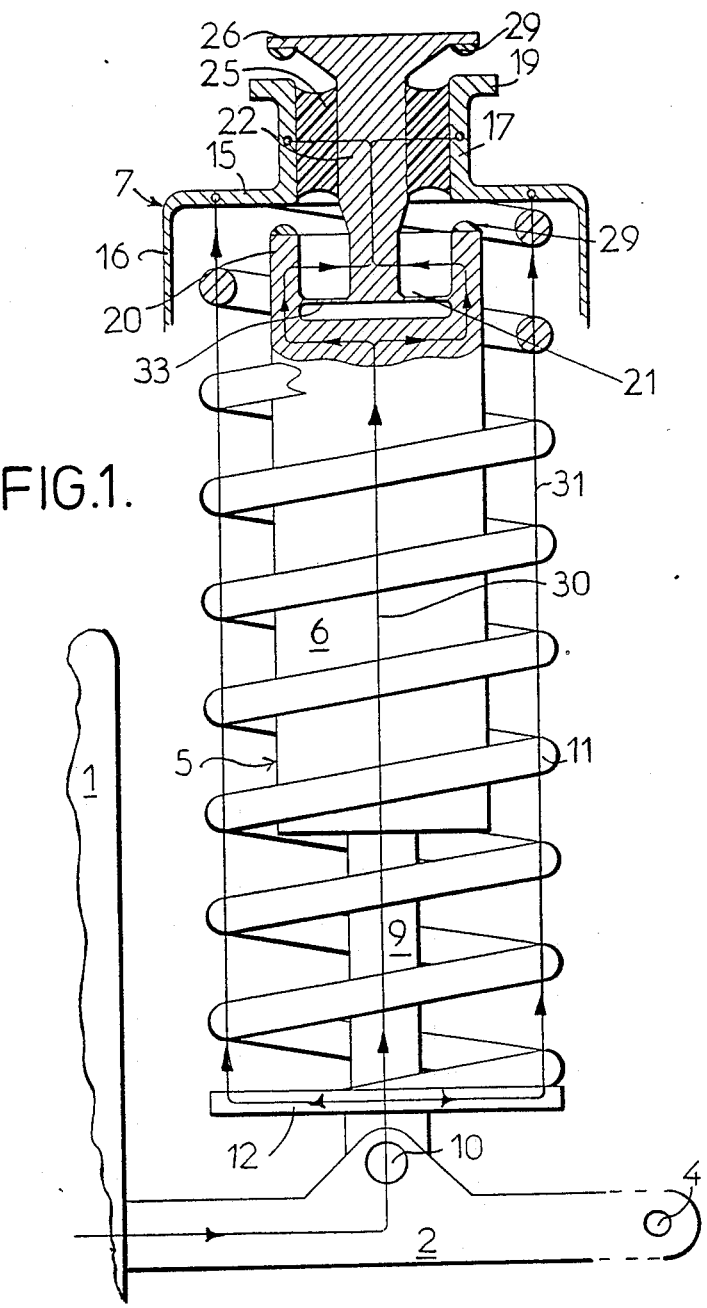
FIG. 1 is a part sectional elevation of a first vehicle suspension unit embodying the invention.
Figure 2:
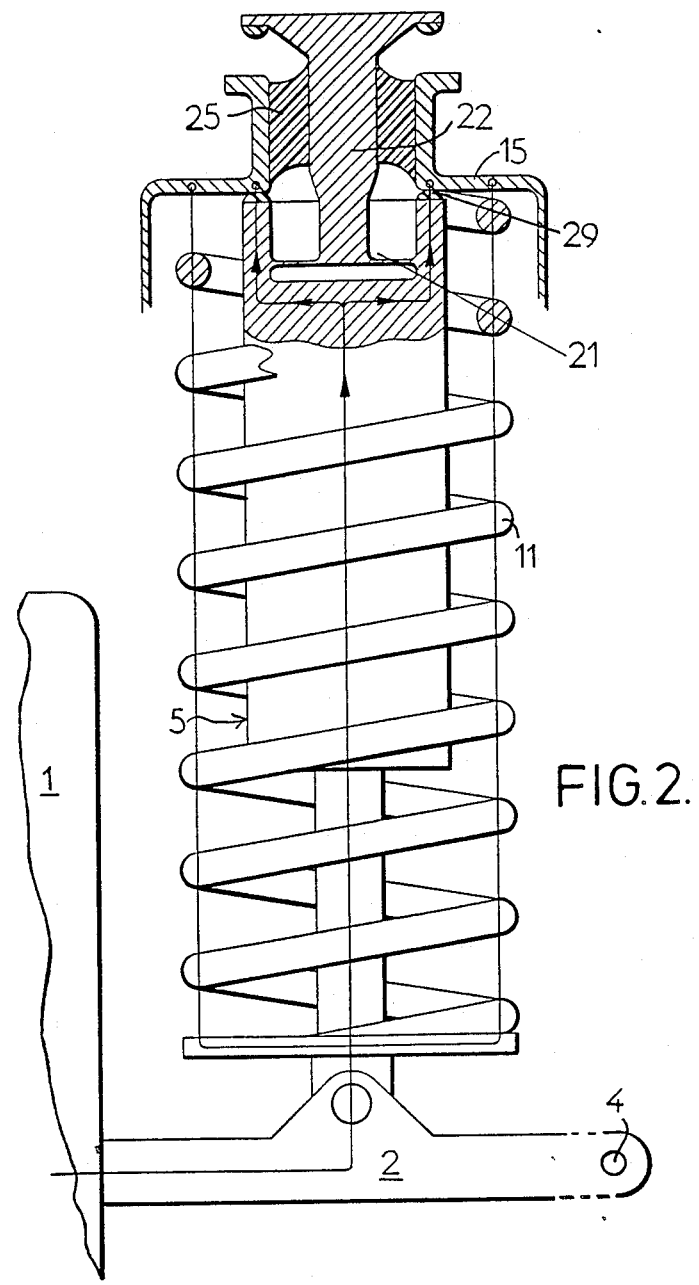
FIG. 2 is a like view of the suspension unit of FIG. 1 in a different condition.

The suspension unit shown in FIGS. 1 and 2 carries a road wheel 1 by means of a suspension arm 2 which is pivotably connected to the vehicle body or chassis at its inner end by a pivot 4. A double acting hydraulic actuator 5 comprises a cylinder 6 extending downwardly from a suspension fitting 7 which may be connected to the vehicle chassis pivotably. The cylinder 6 contains a piston connected to a rod 9 which protrudes from the cylinder to a connection to the arm 2 at a pivot 10 between its ends. A coiled compression spring 11 coaxially surround the actuator 5 extends between the fixed fitting 7 and a seating plate 12 carried on the pivot 10.

The illustrated suspension unit is part of an active suspension system incorporated in a road vehicle. The system is advantageously of the kind disclosed in U.S. Pat. No. 4,625,993 and in the patent to be granted on application Ser. No. 747,130 to which reference may be made for further particulars.

The vehicle suspension fitting 7 has the form of an annular plate 15, from the outer edge of which a wall 16 extends downwardly, to provide an upper seat for the compression spring 1 . From the inner edge of the plate a sleeve 17 extends concentrically upwardly and is provided with an outwardly turned flange 19 at its upper end. The upper end of the actuator cylinder 6 is formed with a concentric recess defined by an annular wall 20 in which a load cell 21 is received. The load cell is annular and connects the wall 20 to a stem 22 extending axially upwardly from the load cell through the sleeve 17, to which it is resiliently connected by a rubber isolator ring 25. The floor of the recess containing the load cell 21 is provided by a flexible panel 23, spaced from the cylinder end wall.

The stem 22 has an outwardly turned flange 26 overlying the flange 19 and downward movement of the stem and thus of the actuator cylinder 6 is limited by engagement of opposed abutment surfaces of the flanges 19 and 26. Upward movement of the stem 22 and the actuator cylinder 6 is limited similarly by engagement of the free upper end of the annular wall 20 with the plate portion 15 of the fitting 7 around its central aperture. Buffers 29 of resilient material are provided, on the flange 26 and on the annular wall 20 to minimise the shock effect of such engagements.

The position shown in FIG. 1 corresponds to normal operation during which actuator loading is such that the upper and lower limit or buffer stops constituted by the buffers 29 remain spaced from the co-operating abutment faces. The load path 30 through the actuator 5 reaches the fitting 7 by way of the load cell 21 and the isolator ring 25, and the load path 31 through the compression spring 11 goes directly to the fitting 7, so as to by-pass the load cell and also the isolator device.

The position shown in FIG. 2 represents an extreme loading condition in which a crash-out load has resulted in engagement of the buffer 29 on the actuator wall 20 with the fitting 7. The load cell 21 and the isolator ring 25 experience only a limited deflection.

In the embodiment of FIGS. 1 and 2, the load cell 21 is in series between the actuator 5 and the fitting 7, with the isolator device constituted by the ring 25 positioned between the cell and the fitting. In the second embodiment, shown in FIGS. 3 and 4, the load cell and isolator device are again in series between the actuator 5 and the fitting but with the isolator device between the load cell and the actuator. Parts of the suspension unit of FIGS. 3 and 4 which are not shown or described are identical to those of the unit of FIGS. 1 and 2. Parts shown which are similar in function to those of the unit of FIGS. 1 and 2 are indicated by the same reference numerals.

The fitting 37 of FIGS. 3 and 4 again comprises an annular plate 39 with a downwardly extending outer wall 16 providing a seating for the spring 11. An upper annular wall 40 extends around the outer edge of the plate 39 and defines with a coaxial inner sleeve 42 an annular recess receiving an annular load cell 41 connected to the wall and to the sleeve. The sleeve 42 is connected to the wall 40 by a flexible panel 43 spaced from the plate 39 and like the sleeve 17 of FIGS. 1 and 2, it has sleeve 42 having an outturned flange portion 19 at its upper end.

The upper end of the actuator cylinder 6 provides an annular upper abutment shoulder (46) carrying the resilient buffer 29, and within the buffer, an isolator stem portion 44 extends upwardly through a tapered portion to a neck 45 received within the sleeve 42, to which it is joined by an annular isolator member 47 of rubber or the like. Above this, the stem portion 44 tapers outwardly to the flange portion 26, provided on its under side with the buffer 29 for engagement with the flange 19.

Figure 3:
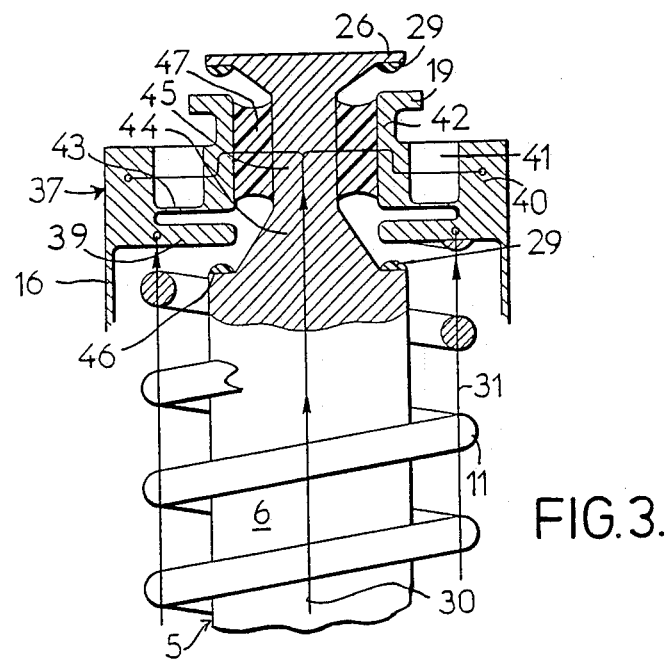
FIGS. 3 and 4 are views similar to those of FIGS. 1 and 2 respectively of the upper part only of a second suspension unit embodying the invention.
Figure 4:
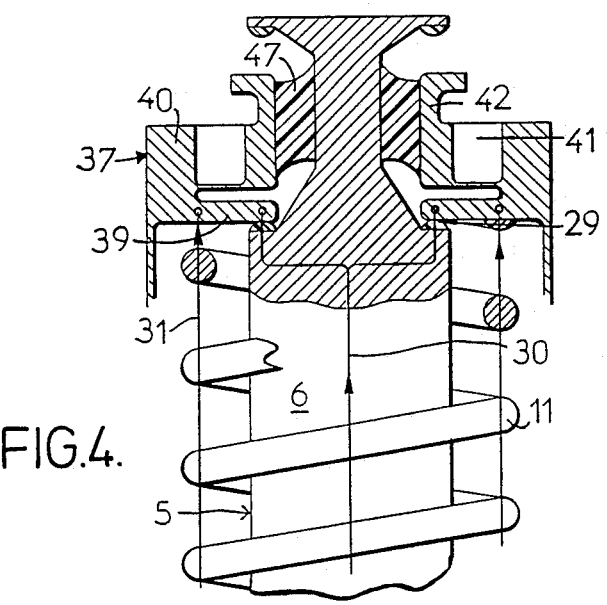

The operation of the suspension unit of FIGS. 3 and 4 need not be described as it is essentially similar to that of the unit of FIGS. 1 and 2.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A suspension unit for a wheel supporting a vehicle body, said suspension unit comprising:
    a wheel mounting member mounting said wheel and pivotably connected to said vehicle body,
    an actuator operative between said mounting member and said vehicle body, said actuator comprising a cylinder, a double acting piston mounted in the cylinder and means to supply fluid under pressure to either side of the piston to move the piston in either direction along the cylinder, the cylinder and piston being operatively connected each to one of the mounting member and the vehicle body respectively,
    transducer means in series with said actuator, said actuator and said transducer means providing a first load path between said mounting member and said vehicle body,
    said transducer means being arranged to provide an electrical signal which varies in accordance with the load in said first load path,
    resilient means in said first load path, and
    spring means operative between said mounting member and said vehicle body and providing a second load path in parallel with said first load path.

2. The suspension unit of claim 1 wherein said transducer means is located between said actuator and said resilient means in said first load path.

3. The suspension unit of claim 1 wherein said resilient means is located between said actuator and said transducer means in said first load path.

4. The suspension unit of claim 1 further comprising stop means limiting relative movement of said actuator and said vehicle body.

5. The suspension unit of claim 1 wherein said actuator and said spring means engage with the vehicle body by way of a suspension fitting secured thereto, wherein said actuator has a stem portion received within said aperture, and wherein said resilient means extends in said aperture between said stem portion and said suspension fitting.

6. The suspension unit of claim 5 wherein said stem extends through said aperture and further comprising limit stop means carried by said actuator and by said stem, said limit stop means being engageable with opposed sides of said fitting around said aperture.

7. The suspension unit of claim 5 wherein said suspension fitting has a first portion secured to said vehicle body and a second portion providing said aperture and wherein said transducer means is located between said first and second portions of said suspension fitting.

8. The suspension unit of claim 5 wherein said transducer means is located between said stem portion and an adjacent portion of said actuator.

9. In a vehicle having road wheels supporting a vehicle body, suspension means for each road wheel comprising:
    a suspension arm mounting said road wheel,
    means pivotably connecting said suspension arm to said vehicle body,
    a suspension fitting secured to said vehicle body,
    a hydraulic actuator operative between said suspension arm and said suspension fitting,
    a coiled compression spring operative between said suspension arm and said suspension fitting and located around said hydraulic actuator,
    a transducer in series with said hydraulic actuator between said suspension arm and said suspension fitting, and
    resilient means in series with said hydraulic actuator between said suspension arm and said suspension fitting, whereby said transducer is responsive to loading of said hydraulic actuator only.

10. The vehicle of claim 9 wherein said fitting has a sleeve portion, said actuator has a stem portion extending axially therefrom into said sleeve portion, and said resilient means comprises a resistant ring received within said sleeve portion.

11. The vehicle of claim 9 wherein said stem protrudes beyond said sleeve portion and further comprising a stop plate carried by said stem beyond said sleeve portion, said stop plate being engageable with said sleeve portion to limit movement of said actuator relative to said fitting.

12. The vehicle of claim 9 wherein said actuator provides abutment means engageable with said sleeve portion to limit movement of said actuator relative to said fitting.

13. The vehicle of claim 9 wherein said fitting has a cup portion around and spaced from said sleeve, said cup portion seating said coiled compression spring.

14. The vehicle of claim 9 wherein said actuator comprises a double-acting actuator having a cylinder connected to said fitting by means of said stem portion and a piston rod pivotably connected to said suspension arm.

15. The vehicle of claim 9 wherein said actuator has an annular wall portion around and spaced from said stem portion, and wherein said transducer comprises a load cell operative between said annular wall portion and said stem portion.

16. The vehicle of claim 9 wherein said fitting includes an outer ring portion, and an annular panel extending between said sleeve and ring portions to define an annular chamber, said transducer comprising a load cell received within said chamber.

17. In a vehicle comprising a vehicle body supported by a plurality of road wheels, an active suspension system responsive to road wheel experience to control road wheel position, said active suspension system comprising:

a suspension unit for each road wheel, each said suspension unit having:

a hydraulic actuator, a transducer in series with said hydraulic actuator and adapted to provide an output dependent on road wheel experience, and resilient means in series with said transducer and said hydraulic actuator, whereby said transducer output is dependent only on wheel experience as experienced by said hydraulic actuator, control means responsive to control signals to adjust the positions of said hydraulic actuators, and control circuitry receiving said transducer output and adapted to supply said control signals to said control means.

* * * * *